United States Patent
Schloter

(10) Patent No.: US 11,276,244 B2
(45) Date of Patent: Mar. 15, 2022

(54) FIXING HOLES IN A COMPUTER GENERATED MODEL OF A REAL-WORLD ENVIRONMENT

(71) Applicant: AB Strategies SEZC Ltd., Grand Cayman (KY)

(72) Inventor: Carl Philipp Schloter, Grand Cayman (KY)

(73) Assignee: AB Strategies SEZC Ltd., Grand Cayman (KY)

( * ) Notice: Subject to any disclaimer, the term of this patent is extended or adjusted under 35 U.S.C. 154(b) by 69 days.

(21) Appl. No.: 16/574,215

(22) Filed: Sep. 18, 2019

(65) Prior Publication Data

US 2020/0090417 A1  Mar. 19, 2020

Related U.S. Application Data

(60) Provisional application No. 62/732,847, filed on Sep. 18, 2018.

(51) Int. Cl.
| | |
|---|---|
| *G06T 5/00* | (2006.01) |
| *G06T 5/50* | (2006.01) |
| *G06T 7/33* | (2017.01) |
| *G06T 7/60* | (2017.01) |
| *G06T 15/04* | (2011.01) |
| *G06T 17/20* | (2006.01) |
| *G06T 19/20* | (2011.01) |

(52) U.S. Cl.
CPC ............ *G06T 19/20* (2013.01); *G06T 5/005* (2013.01); *G06T 5/50* (2013.01); *G06T 7/60* (2013.01); *G06T 15/04* (2013.01); *G06T 17/20* (2013.01); *G06T 2207/10028* (2013.01); *G06T 2219/2004* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 9,013,634 B2 * | 4/2015 | Agarwala | G11B 27/031 348/701 |
| 9,098,926 B2 * | 8/2015 | Quan | G06T 17/00 |

(Continued)

OTHER PUBLICATIONS

James Hays, Alexei A. Efros, "Scene Completion Using Millions of Photographs", 2007, ACM Transactions on Graphics, vol. 26, No. 3, Article 4, pp. 1-8 (Year: 2007).*

Kyungjae Lee, Yuseok Ban and Sangyoun Lee, Efficient Depth Enhancement Using a Combination of Color and Depth Information, 2017, Sensors, 17:1544, pp. 1-27, DOI:10.3390/s17071544 (Year: 2017).*

(Continued)

*Primary Examiner* — Michael J Cobb
(74) *Attorney, Agent, or Firm* — Lowenstein Sandler LLP

(57) ABSTRACT

The disclosure provides technology for generating a photo realistic multi-dimensional computer generated model of a physical environment. An example method involves accessing a model that comprises a set of spatial values; aligning image data with a surface of the model, wherein the image data corresponds to an image value; updating, by a processing device, the model to comprise the image value at a point on the model that is absent a spatial value; analyzing the model and the image value to determine the spatial value for the point on the model; and updating the model to comprise the spatial value at the point on the model.

20 Claims, 4 Drawing Sheets

(56) References Cited

U.S. PATENT DOCUMENTS

| | | | | |
|---|---|---|---|---|
| 2012/0194517 | A1* | 8/2012 | Izadi | G06T 7/20 |
| | | | | 345/420 |
| 2012/0306876 | A1* | 12/2012 | Shotton | G06T 7/251 |
| | | | | 345/424 |
| 2013/0156297 | A1* | 6/2013 | Shotton | G06K 9/6255 |
| | | | | 382/159 |
| 2018/0005448 | A1* | 1/2018 | Choukroun | G06T 5/005 |
| 2019/0026956 | A1* | 1/2019 | Gausebeck | G06T 19/20 |
| 2019/0087965 | A1* | 3/2019 | Datta | G06T 7/251 |
| 2019/0156504 | A1* | 5/2019 | Jiang | G06T 17/20 |
| 2019/0213773 | A1* | 7/2019 | Lee | G06K 9/00248 |
| 2020/0211230 | A1* | 7/2020 | Zhao | G06T 9/001 |
| 2021/0174543 | A1* | 6/2021 | Claessen | G06T 7/344 |
| 2021/0241495 | A1* | 8/2021 | Cappello | G06T 5/005 |
| 2021/0256776 | A1* | 8/2021 | Cappello | G06T 19/20 |

OTHER PUBLICATIONS

Varsha Hedau, Derek Hoiem, David Forsyth, "Thinking Inside the Box: Using Appearance Models and Context Based on Room Geometry," 2010, European Conference on Computer Vision EECV 2010, Part VI, pp. 224-237 (Year: 2010).*

David C. Lee, Abhinav Gupta, Martial Hebert, Takeo Kanade, "Estimating Spatial Layout of Rooms using Volumetric Reasoning about Objects and Surfaces," 2010, Advances in Neural Information Processing Systems 23, pp. 1-9, retrieved from "http://www.cs.cmu.edu/~dclee/pub/nips2010.pdf" (Year: 2010).*

Alexander G. Schwing, Raquel Urtasun, "Efficient Exact Inference for 3D Indoor Scene Understanding," 2012, European Conference on Computer Vision EECV 2012, Part VI, pp. 299-313 (Year: 2012).*

Kevin Karsch, Ce Liu, Sing Bing Kang, "DepthTransfer: Depth Extraction from Video Using Non-Parametric Sampling," 2014, IEEE Transactions on Pattern Analysis and Machine Intelligence, 36(11):2144-2158 (Year: 2014).*

* cited by examiner

FIXING HOLES IN A COMPUTER GENERATED MODEL OF A REAL-WORLD ENVIRONMENT

RELATED APPLICATIONS

This application claims the benefit of U.S. Provisional Patent Application No. 62/732,847 filed Sep. 18, 2018, entitled "CONVERTING REAL-WORLD ENVIRONMENTS INTO PHOTOREALISTIC "VIRTUAL SETS" AND FIXING POINT CLOUDS AND FILLING HOLES," which is incorporated by reference herein.

TECHNICAL FIELD

This disclosure relates to the field of multi-dimensional computer graphics models (e.g., 3D models), in particular, to creating or enhancing a computer graphics model to supplement the model to be more photorealistic.

BACKGROUND

There are a variety of sensor devices that can be used to scan and capture aspects of a user's surroundings. Some of the sensor devices may use one or more lasers, time of flight sensors, or similar technologies to survey the surroundings and capture depth information. The depth information may represent how far object surfaces are from the sensor device. Other sensor devices may capture ambient light from the surrounding and may be similar to a camera that captures a photograph of the user's surroundings. Each sensor device may capture data from different locations.

The data from different locations may be combined together to create a combined representation of the user's surrounding. In one example, multiple photographs may be combined to create a panoramic representation of the surroundings (e.g., 180 or 360 degree views). In another example, multiple depth scans may be combined to create a three dimensional view of the user's surroundings. Each of the scans may provide details not present in the other. The depth scans may provide detailed depth data that is not available in photographs and the photographs may provide detailed color data that is not available in the depth scans.

BRIEF DESCRIPTION OF THE DRAWINGS

The present disclosure is illustrated by way of example, and not by way of limitation, in the figures of the accompanying drawings.

Figure 1:
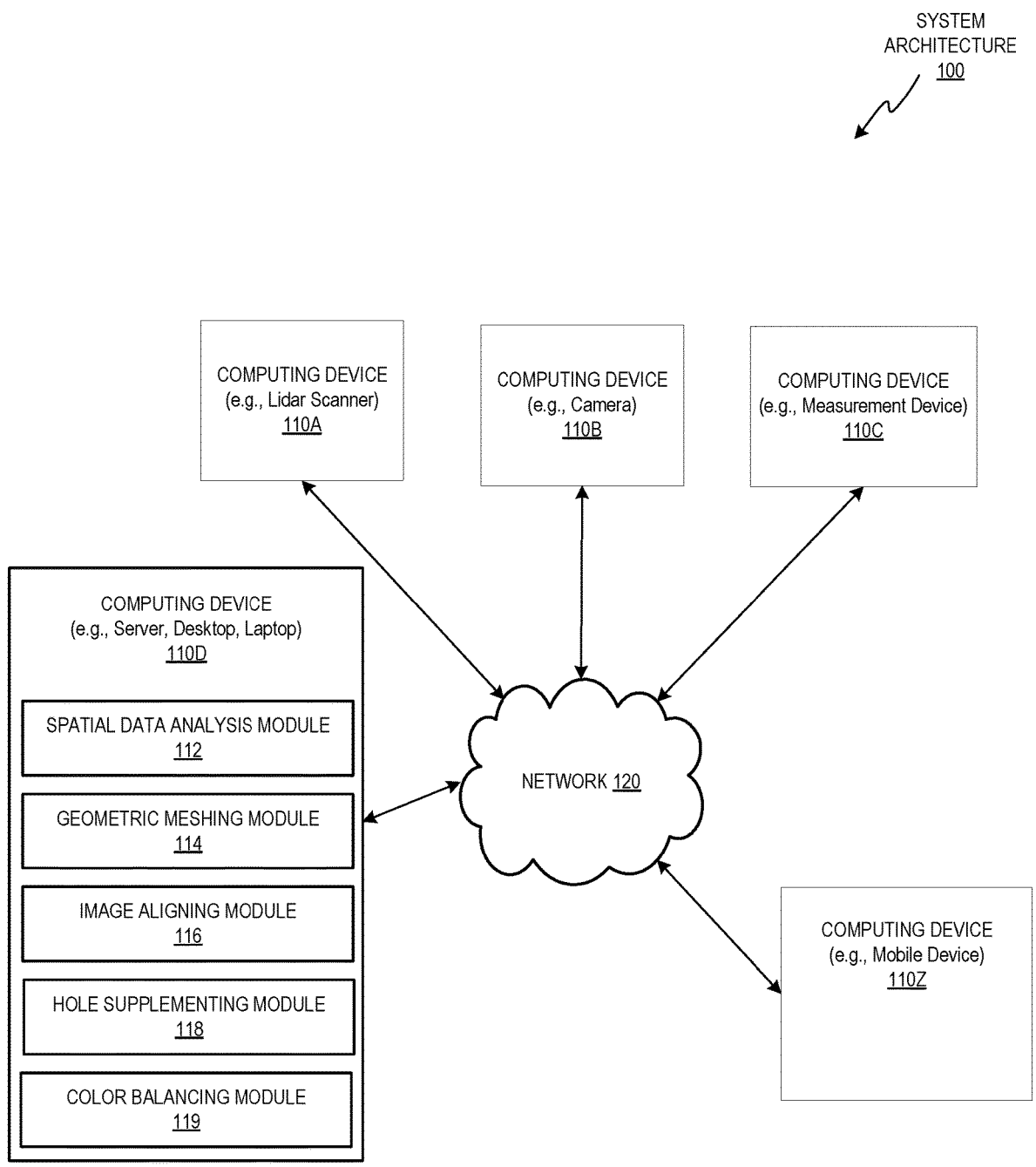
FIG. 1 illustrates an example system architecture for generating photorealistic models of a physical environment, in accordance with an implementation of the disclosure.

These drawings may be better understood when observed in connection with the following detailed description.

DETAILED DESCRIPTION

The technology disclosed herein provides a method and apparatus for producing a model that more accurately represents a real-world environment. The model may be an n-dimensional model (e.g., 3D model) that is enhanced to fill in holes to better represent the physical environment. The enhanced model may be based on spatial data captured using depth scans and based on image data captured via one or more images (e.g., photographs or panoramas). The model may be iteratively enhanced in view of spatial data, image data, other data, or a combination thereof to provide a photorealistic reorientation that provides accurate texture and may eliminate the need for manual remodeling or retexturing.

Aspects and implementations of the present disclosure are directed to technology for updating a model using spatial data and image data to fill in holes in the model. In one example, the technology may involve accessing a model that includes a set of spatial values. The set of spatial values may represent locations on a three dimensional coordinate system and may correspond to a point cloud. The set of spatial values may be based on depth data captured by a depth scanning device and may include regions that are absent spatial data. The absence of spatial data may result in holes or gaps in the model.

The technology discussed herein describes a technique for using image data of one or more photographs to fill the holes in the set of spatial values (e.g., point cloud) and/or revise a geometric mesh of the model. The geometric mesh may be a collection of vertices, edges, faces, triangles, or a combination thereof that define surfaces of the model (e.g., polygon mesh). In one example, the technology may mathematically project image data from one or more photographs onto the model. The technology may update points on the model that are absent spatial values to include image values (e.g., color pixel values) derived from the projected image data. The portion of the model that is absent spatial values may correspond to a missing region of the model. The missing region may initially be absent both spatial data and image data but may now include projected image values. The projected image values may be analyzed in view of the model to classify the missing region. The classified missing region may then be used to update the spatial values in the set of spatial values and/or to update the geometric mesh of the model. In one example, the update may involve adding points to the point cloud and/or updating the geometric mesh of the model to add shapes to represent the background. The added shapes may include a sphere to represent background sky and polygons to represent reflecting windows, glass, other reflective surfaces, bodies of water or other missing surfaces in the depth data.

The updated point cloud and model may have an enhanced appearance and may more accurately depict an environment which may enhance functionality in a variety of applications. Example applications may include virtual reality, augmented reality, mixed reality, training, simulations, games, mobile apps, online experiences, web sites, 3D navigation systems, car navigation systems, out-of-home media, projection experiences, theme parks, film, feature film, TV, broadcast, pre visualizations, visualizations, virtual production, advertising, media, renderings, industrial simulation, space exploration, live production, video stream, web casts, other application, or a combination thereof.

Various aspects of the above referenced methods and systems are described in detail herein below by way of examples, rather than by way of limitation. Some of the examples provided below discusses a model that represents an external physical environment (e.g., outside real-world setting) that may include a plurality of objects with a background that includes a sky, water, buildings, other landscape, or a combination thereof. In other examples, the model may be an internal environment or other environment and may include objects with a different background or a less clear distinction between aspects of a foreground and background.

FIG. 1 illustrates an example system architecture 100 that enables automatic conversion of a real-world environment into a photo-realistic model, in accordance with an implementation of the disclosure. In the example shown in FIG. 1, system architecture 100 may include computing devices 110A-Z, a network 120, or a combination thereof.

System architecture 100 may consist of multiple entities such as a computing devices 110A-Z but is not limited to those. It may be completely implemented on a single computing device or multiple computing devices. In other examples, more or less elements may be present. It should be noted that other architectures for system architecture 100 are possible, and that the implementation of a computer system utilizing embodiments of the disclosure are not necessarily limited to the specific architecture depicted.

Computing devices 110A-Z may include a desktop computer, a laptop computer, a server, a workstation, a tablet computer, a mobile phone, camera device, scanner device, smart watch, other device, or a combination thereof. One or more of the computing devices 110A-Z may be referred to as a "computer device," "user device," "client device," "server device" other variation, or a combination thereof and may be portable (e.g., mobile) or non-portable (e.g., stationary). Computing devices 110A-Z may include one or more generic devices and the features discussed herein may executed by a web browser, peripheral device (e.g., add-on device), stationary hardware equipment, other device, or a combination thereof. Any one of the computing devices 110A-Z may run an interactive program, a non-interactive program, or a combination thereof. An interactive program may receive user input or interface with one or more users and a non-interactive program may perform some or all of the computing tasks without receiving user input or interacting with a user.

Computing devices 110A-C may be data sensor devices that are capable of sensing and capturing data from a surrounding environment. Computing device 110A may actively transmit a signal into the surroundings and sense a response to the transmitted signal. The signal may be based on coherent light (e.g., laser), non-coherent light, other electro-magnetic or acoustic signal, or a combination thereof. The response to the signal may be used by computing device 110A to determine depth information, color information, other information, or a combination thereof. In one example, computing device 110A may utilize a LIDAR scanner (light detection and ranging) that uses one or more lasers, handheld scanners, capture device, or other devices and may output spatial data (e.g., spatial values) and color data (e.g., R,G,B values) that are relative to the position of the device. In another example, computing device 110A may utilize a time of flight sensor or similar device.

Computing device 110B may passively detect light information from the surroundings without transmitting a signal into the surroundings. This may involve sensing electromagnetic radiation (e.g., light, infrared), sound (e.g., acoustic waves), or other energy, that is received from the surroundings. In one example, computing device 110B may or may not include a combination of one or more passive or active sensor-based systems and may be a camera, mobile phone, handheld scanner, other device, or a combination thereof.

Computing device 110C may be the same or similar to computing devices 110A-B and may use one or more structured light sensors. The structured light sensors may be able to capture image data and use the image data to determine spatial data of one or more objects. The structured light sensor may track one or more relative positions between different image frames to determine spatial values. In one example, a pattern may be projected onto the object and the distortion of the projected pattern may be detected, measured, and may be compared against a reference to determine depth. In other examples, one or more of the computing devices 110A-C may utilize a stereoscopic capturing device (e.g., pair of cameras) to determine spatial data (e.g., depth data). The estimated pose of the capturing device and parameters may be aggregated to compute spatial data (e.g., points for a point cloud). Any of computing devices 110A-C may capture, detect, determine, store, and transmit data before, during, or after the sensing occurs so that it can be processed by computing device 110D.

Computing device 110D may analyze data captured by computing devices 110A-C and process the data using one or more modules to generate an enhanced model. The modules may provide processing steps that may be skipped or could be conducted in a different order. Certain steps may also be combined in a single step or performed by another module on a different one of computing devices 110A-Z. In the example shown, computing device 110D includes a spatial data analysis module 112, a geometric meshing module 114, an image aligning module 116, a hole supplementing module 118, and a color balancing module 119.

Spatial data analysis module 112 may access data captured by computing devices 110A-C and perform data processing steps. The data may be derived from one or more capture events (e.g., one or more scans, a panoramic scan). The processing steps may include one or more operations to filter points, apply color to measurement points, compensate distortion of sensors, etc. Spatial data analysis module 112 may also perform one or more data reduction, aggregation, filtering, compression, encoding, formatting, or other data processing steps. The resulting data may change (e.g., reduce) the data storage or processing necessary for subsequent steps. For example, duplicate measurement points may be eliminated or colors may be balanced between different scans. Simplification may reduce the number of pixels in a scan or somehow compress the color and/or spatial values.

Spatial data analysis module 112 may also perform registration of the captured data. This may involve determining the relative position, pose, or rotation of a computing device when the data was captured. Registration may involve determining and analyzing a pose of a sensor device. The pose may be added to each scan and may include a rotation of scanner in Euler Angles, Axis Angle, or other representations as well as a position of the scanner (e.g., XYZ coordinates) or in another representation such as a transform or pose matrix. The rotation and position may be in a global coordinate system or in a relative coordinate system that relates a scan to one or more other scans.

Geometric meshing module 114 may involve analyzing a set of measurement values (e.g., spatial or color) associated with one or more physical objects and identifying one or more shapes that can mathematically represent the objects. The shapes may be geometric shapes and may include triangles, quads, polygons, spheres, other shapes, or a combination thereof. The shapes may be linked together into a mesh. When the mesh includes geometric shapes it may be referred to as a geometric mesh. Likewise, a mesh consisting of polygons may be referred to as a polygon mesh. The mesh may be represented by vertices and faces. The vertices may be vertex indices or the vertices directly. The vertex indices may enable using the same vertex for multiple faces in the mesh and may reduce storage space by connecting faces by sharing vertices. The faces of the mesh may function as the surface of the model.

The points used to represent the shapes of the mesh may be identified in different ways. In one example, the mesh may be determined by selecting and measuring distance between points within a pattern, grid, area, or volume. The points may correspond to existing or non-existing spatial values and the points selected for the vertices may be the most extreme points in a volume or the most common points eliminating outliers. In another example, the mesh may be determined by predicting a shape or mesh or by generating one or more candidates (e.g., shape or mesh) that are evaluated in view of the set of values. The generation of the candidates or the prediction may be based on a technique that uses machine learning, deep learning, or other technique. The technique may or may not be trained on a set of high quality meshes.

Geometric meshing module 114 may also modify the resulting mesh to decrease or increase its complexity (e.g., number of interconnected shapes) using a process referred to as decimation. Decimation may involve reducing the number of points, polygons, triangles, shapes, interconnections, or other feature of a mesh. Different layers of decimated meshes may be computed to create several versions of one or more shapes, meshes, models, or other multi-dimensional representation. Inputs for the decimation may include a target count for the number of points or shapes, a target storage size, a percentage reduction, other value, or a combination thereof. The different layers may function as Different Level of Details (LOD) that can be associated with one or more models to provide different levels of details (e.g., different resolutions). For example, a lower resolution shape or mesh could be displayed when far away from a viewer and a higher resolution shape or mesh could be displayed when a viewer is closer. The decimation may take as input one or more input mesh structures (e.g, set of vertices) and may output one or more output mesh structures. The mesh structures of the model may be used by image aligning module 116

Image aligning module 116 may enable computing device 110D to align a portion of an image and a portion of a model. The image may be based on one or more photographs that capture aspects of an environment that may or may not be represented by the model. In one example, the image data may be associated with contextual data that indicates relative positions, rotations, or poses of the image data. The contextual data may be used to mathematically project image data of the image onto the model and may be derived from the original image or during a registration process of the image. In one example, contextual data may include a matrix for each image of the environment (e.g., photograph, panorama, depth scan).

The process of aligning may involve analyzing data of an image and data of the model to identify a region match (e.g., corresponding points, areas, or volumes). The alignment process may involve one or more operations that may be the same or similar to mapping, projecting, plotting, other operation, or a combination thereof. In one example, aligning the portions may involve mathematically projecting image data of one or more images onto the corresponding surface of the model (e.g., UV mapping). In another example, aligning may involve mathematically projecting a surface of the model onto the image (e.g., 3D Projection).

The process of aligning may be the same or similar to texturing and may involve projecting image data (e.g., color, HDR, intensity or gray scale data) onto the mesh or a point cloud corresponding to the model. The image data may have been captured through a panorama device (e.g., 360 degree device or camera), a high dynamic range (HDR) device, a digital single-lens reflex (DSLR) camera, a LIDAR device, mobile phone, other sensor device, or a combination thereof. The alignment may involve computing a view matrix or projection matrix, or by making other computations based on camera parameters such as focal length (f), field of view (FoV), image size (e.g., resolution, width, height), sensor size (e.g., area, width, height), camera size, model, distortion parameters, other metrics, or a combination thereof.

Image aligning module 116 may also update the images or models based on the aligned portions. In one example, the model may be updated to include values derived from the aligned image (e.g., model updated with color values). In another example, the image or image data may be updated to include values derived from the aligned model (e.g., image updated with spatial values). In the former, the model may be updated to apply or reapply color, intensity, or other values to a region of the model (e.g., face of the mesh). This supplements regions of the model (e.g., points, areas, or volumes) that are absent measurement data (e.g., color values and/or spatial values) with color values derived from the image.

In one example, image aligning module 116 may perform UV mapping to align the portions of the image and model. UV mapping, PTEX, or similar methods may be used to project two dimensional (2D) image data onto a surface of a three dimensional (3D) model for texture mapping. The letters "U" and "V" denote the axis of the two dimensional texture since the letters "X," "Y," and "Z" may already denote the axis of the 3D model. In one example, UV mapping functions to "unwrap" a three dimensional mesh onto a two dimensional surface to better align with the two dimensional image. UV mapping may indicate which part of an image will get applied to which part of the mesh so that color data can be efficiently applied to the mesh. In one example, a physical painting hanging on a wall in an environment may be represented as a polygon consisting of four vertices corresponding to the four corners of the physical painting, but an image of the physical painting may have color data for within or between the vertices. In one example, a UV mapping data structure may be generated that includes a vertex as U and V coordinate values. The U and V coordinate values may be interpolated to define the coordinate in the image that should get mapped onto a specific aspect of the model (e.g., face of the mesh).

Image aligning module 116 may perform one or more features present in photogrammetry using a single image or a group of images. Photogrammetry may be a technique of extracting spatial data (e.g., three dimensional measurements) from two-dimensional data (e.g., one or more images). For example, the distance between two points that lie on a plane parallel to the photographic image plane can be determined by measuring their distance on the image once the scale of the image is known (e.g., after alignment with a 3D model). The images being analyzed may or may not include information indicating the scale and it may be derived using the pose from which the image was captured.

The pose and scale may be computed by identifying common interest points between the image and model. The interest points may be unique features (e.g., corners, high contrast points) that are common to both the image and the model. Identifying the interest points may involve identifying an interest point in a first source (e.g., point cloud or model) and then identifying corresponding candidate interest points in one or more other sources (e.g., image). The interest points in the model may be based on a 3D rendering or a 2D rendering from different perspectives and a correlation or matching algorithms may rank candidates until a set of interest point pairs between the image and model are identified. Given a set of interest point pairs between the 2D photo and the 3D scene or a rendering of the 3D scene, or interest point pairs between different 2D photos, a 3D camera can be computed. The common interest points may be used to determine the pose of the image in relation to the model. The resulting pose may be stored as a matrix, or a combination of a position (e.g., XYZ coordinate to identify the location) and rotation (e.g., Euler angle vector, or Axis angle or rotation matrix), or other representation.

The pose and/or scale may also or alternatively be determined in view of distortion measurements, lens information, focal length, aperture, exposure, sensor size, sensor width, sensor height, model name, manufacturer, lens manufacturer, lens model name, camera manufacturer, image resolution, image width, image height or any other such data or context could be used to compute the a pose. For example, a scan could take place at night, and then photos from daytime could be used to color the scans, point cloud or texture the meshes. Also scans could be taken without color information and then photos or panoramas from another camera that may be able to capture that information more quickly or efficiently than the main scanner could be used and applied as texture to the mesh. Given this approach, even a single photo could be aligned to a 3D scene without needing overlapping photos or multiple photos of a scene.

In one example, the photogrammetry features discussed above may correspond to stereophotogrammetry that identifies three dimensional spatial data (e.g., three-dimensional coordinates of points) for an object using multiple photographic images (not just a single photographic image). The multiple images may be taken from different positions (e.g., stereoscopy). Interesting points may be identified on each image and a line of sight (or ray) can be constructed from the camera location to the point on the object. The intersection of these rays (e.g., triangulation) may indicate the three-dimensional location of the point.

Hole supplementing module 118 is discussed in more detail in regards to FIG. 2 below and may analyze data of the model and images to identify and classify regions of the model that are absent spatial data. The missing regions may be referred to as holes and may correspond to missing points in a point cloud, missing shapes in a mesh, other missing data, or a combination thereof. The missing regions may include one or more points, areas, volumes, shapes, or other portion of a model. Hole supplementing module 118 may enable computing device 110D to update the missing region with data (e.g., spatial data and/or image data).

Color balancing module 119 may enable computing device 110D to color balance the model. The color balancing may be performed on the model, images, captured data, or other data and may occur before, during, or after, the alignment, projection, mapping, model updating, other operation, or a combination thereof. Color balancing may involve color correcting, grading, or making local or global adjustments of the intensities of the colors. This may affect the primary colors (e.g., red, green, and blue, HSV, YUV or other color representation or space) but may also apply to shades of grey and may be the same or similar to gray balance, white balance, or neutral balance. Color balance may modify the mixture of colors of the model or image using UV mapping. The UV mapping may produce a layout that defines which faces or shapes are connected in image space and figure out all the data sources available. The data sources may be spatial scans (e.g., Lidar scan), image (e.g., photographs), models (e.g., surface texture), other sources, or a combination thereof. Color balancing module 119 may compare multiple scans and/or photos to determine which best covers an area being balanced. If multiple scans are needed to adequately cover a surface, the colors could be adjusted by color balancing smaller or less frequent scan images that cover the surface or those scan images or photos that have less or more variance or distribution in the image data. This way one main scan photo or image could be determined, and other photos or images could be adjusted to be better match the main image or photo used to texture the surface. Also, other cameras (e.g. film, photo, mobile, or digital cameras), look up table (LUT), color data, camera model reference information, sensor information, exposure, aperture, lens information, or other color science information could be used as reference to adjust photos or scan images to better match a certain look, color or distribution.

Network 120 may include a public network (e.g., the Internet), a private network (e.g., a local area network (LAN), wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Figure 2:
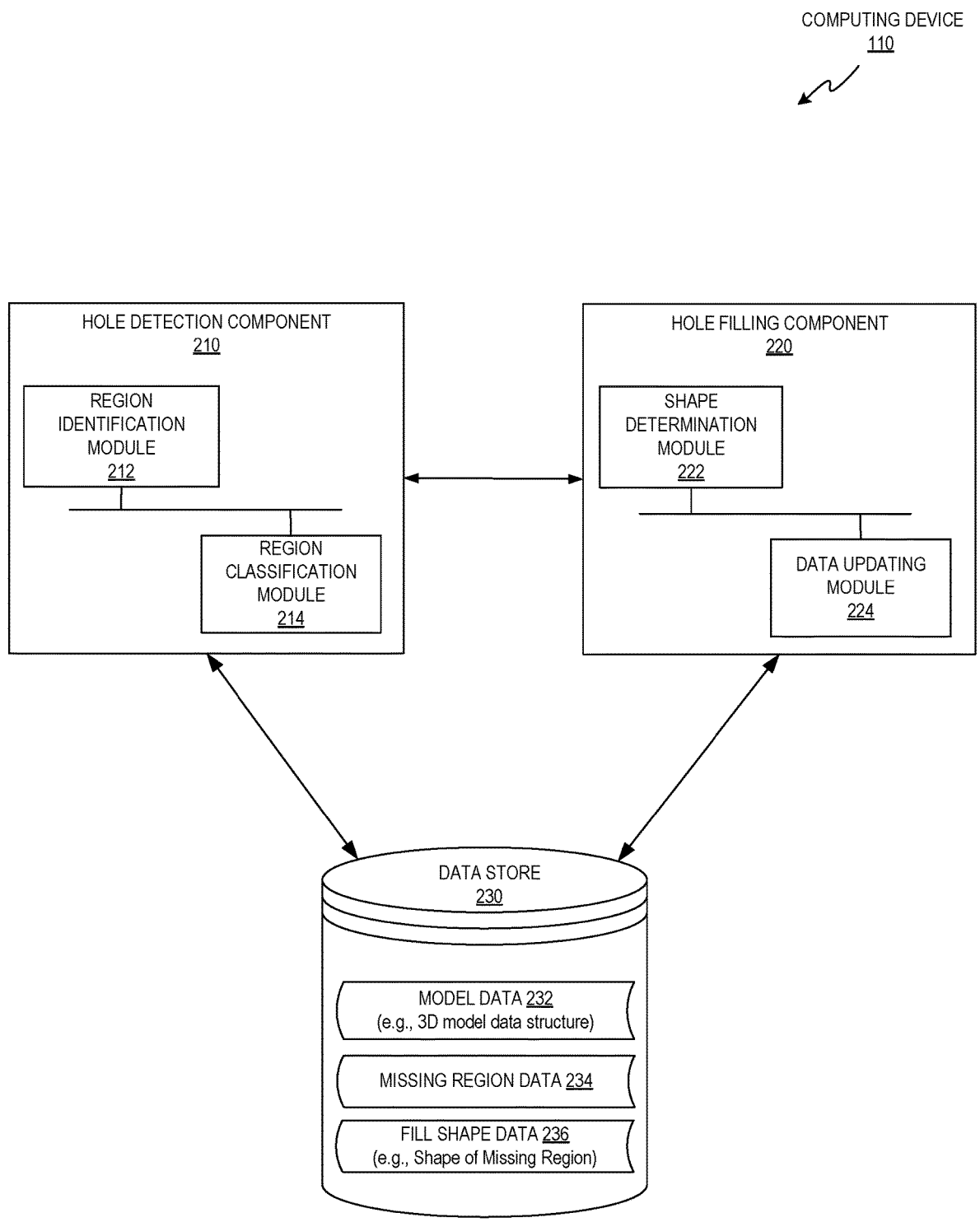
FIG. 2 is a block diagram illustrating example components and modules of a computing device, in accordance with an implementation of the disclosure.

FIG. 2 depicts a block diagram illustrating an exemplary computing device 110 that implements technology for enhancing computer generated models to enable them to more accurately reflect a physical environment, in accordance with one or more aspects of the present disclosure. Computing device 110 may be the same or similar to one or more of the computing devices 110A-Z in FIG. 1. Computing device 110 may implement features of hole supplementing module 118 and update model data 232 for one or more models. More or less components or modules may be included without loss of generality. For example, two or more of the components may be combined into a single component, or features of a component may be divided into two or more components. In one implementation, one or more of the components may reside on different computing devices (e.g., a client device and a server device).

Hole detection component 210 may analyze data of the model and identify and classify regions of the model that are absent spatial data. The missing regions may be referred to as holes and may correspond to missing points in a point cloud, missing shapes in a mesh, other missing data, or a combination thereof. The missing regions may include one or more points, areas, volumes, shapes, or other portion of a model and may be stored as missing region data 234. In one example, hole detection component 210 may include a region identification module 212 and a region classification module 214.

Region identification module 212 may be used to detect missing regions by analyzing raw scans, point clouds, meshes, or models to identify regions that are absent spatial values. Detecting the missing regions may involve machine learning, deep learning, user selection input, other input, or a combination thereof. In one example, this may involve scanning a model to identify regions that have color values (e.g., RGB or other color space values) but are missing spatial data (e.g., no 3D coordinates/XYZ values). The regions in the model may be absent spatial values for a variety of reasons that depend on the properties of the physical environment. The properties may relate to position (e.g., far away), shape (e.g., planar), material (e.g., reflective, absorptive), color (e.g., black shadow), pattern (e.g., checkered), other physical property, or a combination thereof. In one example, the spatial values may be absent because a portion of the physical environment is at a far distance from a position of a sensor device. This may be common for a background, such as, a sky, a landscape, a body of water, or other feature that is much farther from the sensor device compared to foreground objects. The far distance may cause the signal responses (e.g., laser reflections) to be inaccurate or absent do to obstructions or the time in which the signals are expected. In another example, the spatial values may be absent because the portion of the physical environment is reflective and the signal or signal response may get reflected and not return to the sensor device. This may occur with surfaces, such as, glass (e.g., mirrors, windows), water (e.g., pools, ponds, and oceans), other materials or objects, or a combination thereof. In yet another example, the spatial values may be absent because the portion of the physical environment may absorb or dampen signals (e.g., shadows or high absorbing materials).

Region classification module 214 may enable computing device 110 to classify the missing region into one or more of the examples discussed above (e.g., background, reflective, absorbent). In a simplified case, the missing regions may be classified into one of a plurality of classification. The classification may be based on the projected image values at the locations that are absent the spatial values and may or may not be based on values of surrounding points (e.g., spatial value, color value, or projected image value of nearby points). In one example, region classification module 214 may use a heuristic algorithm to predict which missing regions correspond to a background (e.g., sky) and which missing regions correspond to one of the other classifications, such as those corresponding to reflective surfaces.

To distinguish between backgrounds and reflective materials the heuristic may analyze different factors. A first factor may be whether the missing region connects at the top of a scene as is common with many backgrounds. Also, backgrounds may have common colors and textures and may cover a larger area than other classification types. Detecting reflective material may involve by analyzing factors related to specular shading for corresponding portions of the mesh. Other shade attributes could also be set by logic or learned properties and analyzing the scans, UV map, or mesh. For example, refraction, ambient properties, subsurface scattering or template-based or library-based shade defaults (e.g. for trees, water, glass, etc.). A reflective region may be further sub classified as a window when there are sporadic points in the missing region that reflected data or there are gaps common with the shape of a window. For example, windows often have a solid frame that would likely be captured by a scan because they are generally not reflective. In a simple example, the heuristic may make one or more assumption about the classification of a missing region and may test the assumption before selecting the best classification. For example, missing regions that do not correspond to a background (e.g., not sky) are likely planar and that the background areas are likely far away from the scan position.

Hole filling component 220 may enable computing device 110 to update the missing region after the classification to fill in missing data (e.g., spatial data and/or image data). As shown in FIG. 2, Hole filling component 220 may include a shape determination module 222 and a data updating module 224.

Shape determination module 222 may determine a shape that corresponds to the missing region. The shape may be referred to as a fill shape and may be the same or similar to the geometric shapes discussed above in regards to the meshing (e.g., polygon, sphere, etc.). The fill shape may be stored in data store 230 as fill shape data 236 and may be an approximate shape that covers more than the missing region, less than the missing region, or a combination thereof. In one example, the fill shape may be formed around the bounds of the missing region and may be a convex polygon or concave polygon. The fill shape may be rotated, positioned, enlarged, or adjusted and may or may not be added to the geometric mesh or model. The complexity of the fill shape may be adjusted by shape determination module 222 in view of user input. For example, the fill shape may be defined by the user (e.g., drawn by user) or a candidate fill shape may be presented to the user and the user may modify the candidate fill shape.

The resulting fill shape may then be analyzed to determine its location relative to other portions of the model. A portion of the fill shape may correspond to image data, spatial data, or a combination thereof and the portion may be associated with an aspect of the fill shape, such as, the corners, or outside area of that polygon, the border of that polygon, or even points inside the polygon that may have some form of spatial data (e.g., depth information, 3D coordinates, or XYZ coordinates). Based on this information, the spatial location of the fill shape may be derived and used to derive spatial data for other portions of the fill shape. An assumption or algorithm prediction could be made in view of the classified region on whether the region is likely planar or follows a more complex shape. Planar regions can be filled in by computing the plane connecting the borders, corners, inside points, or outside points around the area or fill polygon or shape.

In one example, the missing regions may be classified in view of the image data as a background at a far distance. Because of the far distance, the scans or other captures of the background may not include spatial data (e.g., no laser response signal). But the images (e.g., photos) may include aspects at the far distances (e.g., objects, buildings, sky). To incorporate the captured aspects at the far distance, shape determination module 222 may analyze the images directly or analyze the image data incorporated into the model to compute a shape to represent the missing background region. For example, a sky background may correspond to a background sphere and buildings in the background may correspond to one or more cubes.

A shape that is used as a background may be referred to as a background shape and the interior portion of the background shape may be used as a fill shape and may be incorporated into the model. For example, a sky may be represented as a sphere and when projecting data onto the model (e.g., texturing) the image data may be projected onto the interior surface of the sphere. Likewise the background may be the interior of a room or building and may be represented by a cube. When projecting data onto the model the image data may be projected onto the interior surface of the cube. A sphere, cube, or flat plane may provide good approximations because at far distances the differences in depth may be less apparent. In one example, the spatial data for the background shape may be determined by computing a bounding box of the mesh or point cloud to determine the center of the physical environment and used to approximate a location or size of the background shape (e.g., radius of sphere or cube length and width).

Data updating module 224 may enable computing device 110 to supplement the missing regions with data (e.g., fill in missing spatial data). Supplementing the missing regions may be the same as filling in holes and may involve filling in spatial values, image values, other values, or a combination thereof using techniques discussed above. Supplementing the missing regions may involve adding points to a point cloud, adding surfaces to the model, adding shapes to a mesh of the model, or a combination thereof. In one example, data updating module may use a previously determined fill shape to supplement the missing data. In another example, data updating module 224 may supplement the missing data without determining a fill shape.

The data used to supplement a missing region that is classified as a background (e.g., sky in a photograph) could be associated with one or more points, fill shapes, or meshes at a particular distance. The distance may selected based on data associated with the image, which may include contextual data or pixel data derived from one or more images. For more complex shapes or complex predictions, the location or surface of the region can be predicted by deep learning, machine learning, logic, features or other algorithms (e.g., training based on sample data). This may also or alternatively involve designating (e.g., hard-coding) certain features of what shapes are expected based on the existing spatial data and image data. The distance may also be selected based on the distribution of values (e.g., spatial or image), color variations, color patterns, transitions, contrast, intensity values, geospatial information (GPS), proximity information, other location information, information about the geographic area (e.g., terrain, weather), information about the nature of properties, towns or values, databases with information of common structures in a location, city, town, state, or country, or any other type, time of day, camera information, scanner model information, leveling information, or any other type of data or context.

When using a fill shape, the data updating module 224 may use spatial values or image values associated with a fill shape to update the missing region. This may or may not involve projecting or mapping values from a two dimensional space (e.g., image space) to a three dimensional space (model space). This may be done in addition to a prior projection process that was used to map the image values onto the model. The additional projection may be referred to as a re-projection and may project color data previously captured back onto the newly filled regions. In one example, a normal may be computed and then only existing points with an existing image value or color value may get the corresponding spatial values updated (e.g., filled in). In another example, all points corresponding to the fill shape may have the spatial values updated even if the point had an existing spatial value. In either example, updating spatial values may involve adding new spatial values, replacing the existing spatial values, or blending the new and existing spatial values (e.g., averaging, normalizing, matrix-based modification).

Data store 230 may be a memory (e.g., random access memory), a cache, a drive (e.g., a hard drive), a flash drive, a database system, or another type of component or device capable of storing data. Data store 230 may also include multiple storage components (e.g., multiple drives or multiple databases) that may also span multiple computing devices (e.g., multiple server computers).

Figure 3:
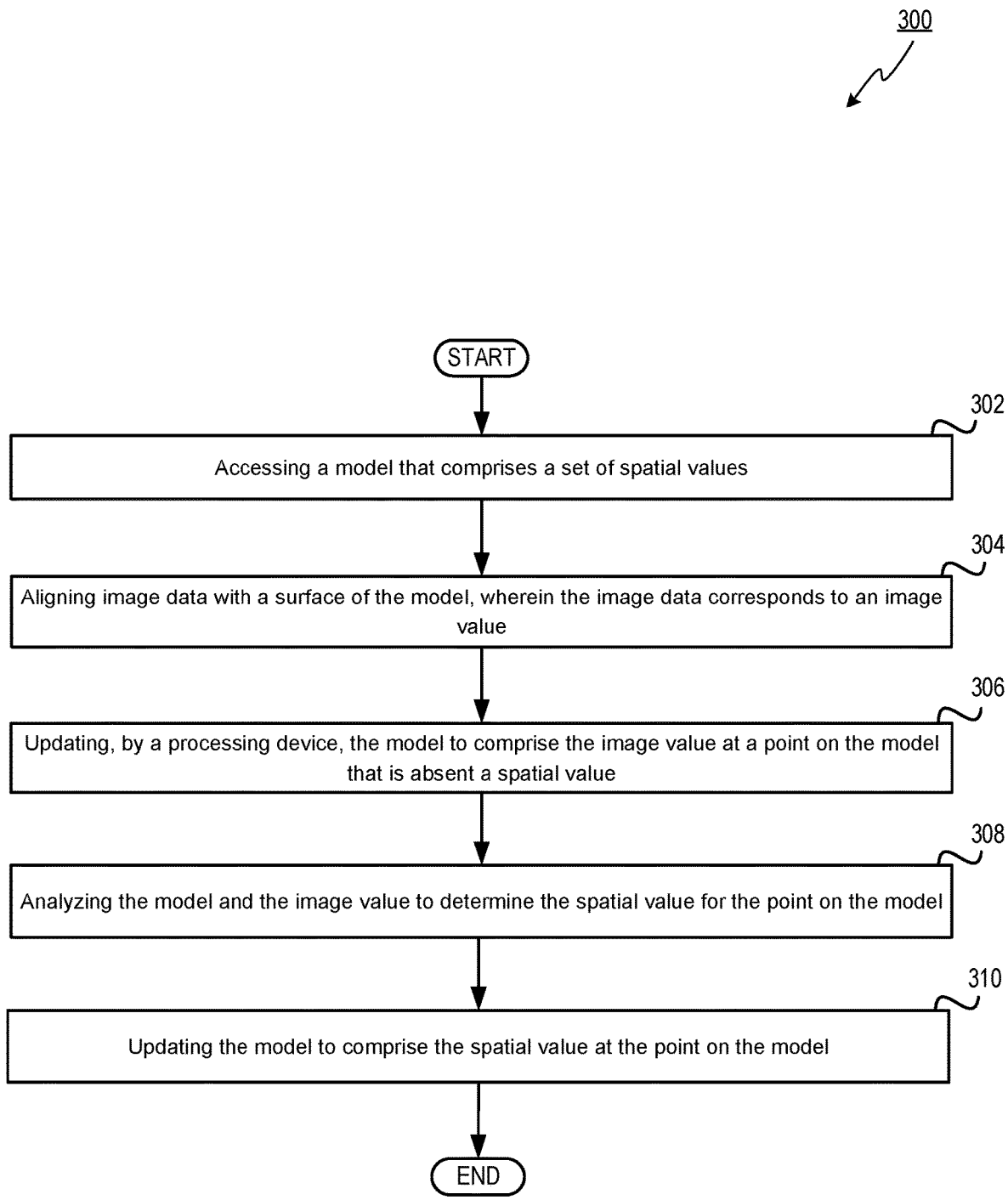
FIG. 3 is a flow diagram illustrating an example method in accordance with an implementation of the disclosure.

FIG. 3 depicts a flow diagram of one illustrative example of a method 300 for updating a model to make it more photorealistic, in accordance with one or more aspects of the present disclosure. Method 300 and each of its individual functions, routines, subroutines, or operations may be performed by one or more processors of a computing device executing the method. In certain implementations, method 300 may be performed by a single computing device. Alternatively, method 300 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by modules of FIGS. 1 and 2.

Method 300 may be executed by processing devices of a client device or server device and may begin at block 302. At block 302, a processing device may access a model that comprises a set of spatial values. The model may be a three dimensional model of an environment that comprises a plurality of objects. The model may include a geometric mesh that includes polygon shapes representing the objects and may be updated to include a spherical shape that represents a background of the objects. The model may include one or more surface models, wireframe models, solid models, other computer graphics representation, or a combination thereof.

At block 304, the processing device may align image data with a surface of the model, wherein the image data corresponds to an image value. Aligning the image data with the surface of the model may involve projecting image data of an image onto a surface of the model or projecting the surface of the model onto the image. In one example, projecting the image data of the image onto the model may involve projecting the image data onto an interior surface of a spherical shape that represents a background. In one example, the aligning may involve generating a texture map in view of a plurality of two dimensional images and UV mapping data of the texture map to a three dimensional surface of the model.

At block 306, the processing device may update the model to include the image value at a point on the model that is absent a spatial value. Updating the model to include the image value may involve adding a color value to the point on the model, replacing the color value of the point on the model, or blending the color value of the point with the image value. In one example, the model may be updated to add image values to all points of the model that are both absent a spatial value and correspond to one of the projected image values.

At block 308, the processing device may analyze the model and the image value to determine the spatial value for the point on the model. In one example, analyzing the model may involve detecting a region of the model that is absent spatial values and classifying the region of the model based on projected image values. The region may be or include at least one of a sky, a landscape, or a body of water. The analyzing may also identify a geometric shape that corresponds to the classified region. For example, a spherical shape may correspond to the sky and a cube shape may correspond to a body of water.

At block 310, the processing device may update the model to comprise the spatial value at the point on the model. In one example, the updating may involve updating a portion of the model to include spatial values corresponding to the identified geometric shape. In another example, the update of the model may update the set of spatial values that correspond to a point cloud. The point cloud may include data points for a plurality of objects and before the update may be absent data points for a background of the plurality of objects. Each of the data points of the point cloud may include a spatial value and at least one color value. Updating the model to comprise the spatial value may involve adding a new point to the point cloud and the new point may include the spatial value determined in view of the image value. Responsive to completing the operations described herein above with references to block 310, the method may terminate.

Figure 4:
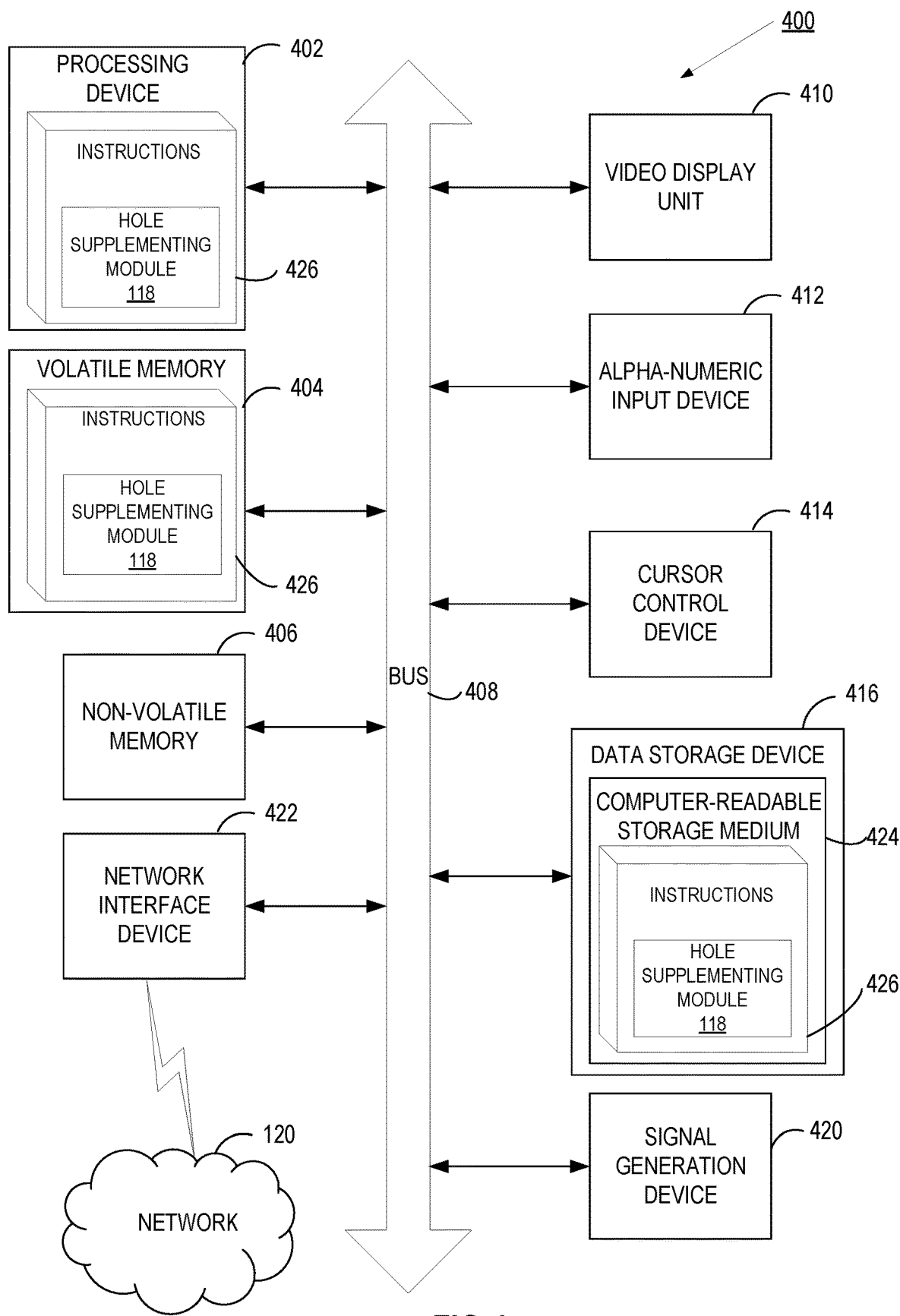
FIG. 4 is a block diagram illustrating example of a computer system in accordance with an implementation of the disclosure.

FIG. 4 depicts a block diagram of a computer system operating in accordance with one or more aspects of the present disclosure. In various illustrative examples, computer system 400 may correspond to computing devices 110A-Z of FIG. 1. The computer system may be included within a data center that supports virtualization. In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 may also include a video display unit 410 (e.g., an LCD), an alphanumeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions for implementing method 300 and for hole supplementing module 118 of FIG. 1.

Instructions 426 may also reside, completely or partially, within volatile memory 404 and/or within the processing device 402 during execution thereof by computer system 400, hence, volatile memory 404, and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
accessing a model that comprises a region and a set of points, wherein the set of points comprises multiple points with depth values and a point in the region that is absent a depth value;
aligning image data with the region of the model, wherein the image data comprises an image value that is absent a depth value;
updating, by a processing device, the model to comprise the image value at the point on the model that is absent the depth value;
analyzing the updated model to classify the region of the model;
determining a depth value for the point on the model based on the classified region; and
updating the model to comprise the depth value at the point on the model.

2. The method of claim 1, wherein the model is a three dimensional model of an environment that comprises a plurality of objects, wherein the three dimensional model comprises at least one of a surface model, a wireframe model, or a solid model.

3. The method of claim 1, wherein the model comprises a geometric mesh that comprises polygon shapes representing objects and a spherical shape representing a background of the objects.

4. The method of claim 1, wherein the set of points of the model corresponds to a point cloud and wherein the set comprises multiple data points for a plurality of objects and is absent data points for a background of the plurality of objects, wherein the multiple data points include a data point that comprises a depth value and at least one color value.

5. The method of claim 1, wherein the image value comprises a color value and wherein updating the model to comprise the image value comprises adding the color value to the point on the model, replacing an existing color value of the point on the model with the color value, or blending the existing color value of the point with the color value.

6. The method of claim 1, wherein updating the model to comprise the image value comprises adding image values of the image data to points of the model that are absent depth values and to points of the model that include depth values.

7. The method of claim 1, wherein analyzing the updated model comprises:
detecting the region of the model that is absent depth values;
classifying the region of the model based on the image value and other image values of the region, wherein the region comprises at least one of a sky, a landscape, or a body of water;
identifying a geometric shape corresponding to the classified region, wherein a spherical shape corresponds to the sky and a cube shape corresponds to the body of water; and
updating points in the region of the model to comprise depth values corresponding to the geometric shape.

8. The method of claim 1, wherein aligning the image data with the surface of the model comprises projecting the image data of an image onto a surface of the model or projecting the surface of the model onto the image.

9. The method of claim 8, wherein projecting the image data of the image onto the model comprises projecting the image data onto an interior surface of a spherical shape that represents a background.

10. The method of claim 1, further comprising:
generating a texture map in view of a plurality of two dimensional images, wherein the texture map comprises the image value that is added to the model; and
UV mapping data of the texture map to a three dimensional surface of the model.

11. A system comprising:
a memory; and
a processing device communicably coupled to the memory, the processing device to:
access a model that comprises a region and a set of points, wherein the set of points comprises multiple points with depth values and a point in the region that is absent a depth value;
align image data with the region of the model, wherein the image data comprises an image value that is absent a depth value;
update the model to comprise the image value at the point on the model that is absent the depth value;
analyze the updated model to classify the region of the model;
determine a depth value for the point on the model based on the classified region; and
update the model to comprise the depth value at the point on the model.

12. The system of claim 11, wherein the model is a three dimensional model of an environment that comprises a plurality of objects, wherein the three dimensional model comprises at least one of a surface model, a wireframe model, or a solid model.

13. The system of claim 11, wherein the model comprises a geometric mesh that comprises polygon shapes representing objects and a spherical shape representing a background of the objects.

14. The system of claim 11, wherein the set of points of the model corresponds to a point cloud and wherein the set comprises multiple data points for a plurality of objects and is absent data points for a background of the plurality of objects, wherein the multiple data points include a data point that comprises a depth value and at least one color value.

15. The system of claim 11, wherein the image value comprises a color value and to update the model to comprise the image value, the processing device is to add the color value to the point on the model, replace an existing color value of the point on the model with the color value, or blend the existing color value of the point with the color value.

16. A non-transitory machine-readable storage medium storing instructions which, when executed, cause a processing device to perform operations comprising:
accessing a model that comprises a region and a set of points, wherein the set of points comprises multiple points with depth values and a point in the region that is absent a depth value;
aligning image data with the region of the model, wherein the image data comprises an image value that is absent a depth value;
updating the model to comprise the image value at the point on the model that is absent the depth value;
analyzing the updated model to classify the region of the model;
determine a depth value for the point on the model based on the classified region; and updating the model to comprise the depth value at the point on the model.

17. The non-transitory machine-readable storage medium of claim 16, wherein the model is a three dimensional model of an environment that comprises a plurality of objects, wherein the three dimensional model comprises at least one of a surface model, a wireframe model, or a solid model.

18. The non-transitory machine-readable storage medium of claim 16, wherein the model comprises a geometric mesh that comprises polygon shapes representing objects and a spherical shape representing a background of the objects.

19. The non-transitory machine-readable storage medium of claim 16, wherein the set of points of the model corresponds to a point cloud and wherein the set comprises multiple data points for a plurality of objects and is absent data points for a background of the plurality of objects, wherein the multiple data points include a data point that comprises a depth value and at least one color value.

20. The non-transitory machine-readable storage medium of claim 16, wherein the image value comprises a color value and wherein updating the model to comprise the image value comprises adding the color value to the point on the model, replacing an existing color value of the point on the model with the color value, or blending the existing color value of the point with the color value.

* * * * *